(12) United States Patent
Chen et al.

(10) Patent No.: US 9,462,061 B2
(45) Date of Patent: Oct. 4, 2016

(54) METHOD, DEVICE, SERVER, AND SYSTEM FOR MANAGING DEVICES

(71) Applicant: Tencent Technology (Shenzhen) Company Limited, Shenzhen (CN)

(72) Inventors: Bo Song Chen, Shenzhen (CN); Xin Hui Zhang, Shenzhen (CN); Xiao Bo Mao, Shenzhen (CN); Can Wang, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 378 days.

(21) Appl. No.: 14/084,448

(22) Filed: Nov. 19, 2013

(65) Prior Publication Data

US 2014/0082151 A1 Mar. 20, 2014

Related U.S. Application Data

(63) Continuation of application No. PCT/CN2013/076144, filed on May 23, 2013.

(30) Foreign Application Priority Data

Sep. 14, 2012 (CN) .......................... 2012 1 0341323

(51) Int. Cl.
*G06F 15/16* (2006.01)
*H04L 29/08* (2006.01)

(52) U.S. Cl.
CPC ............. *H04L 67/14* (2013.01); *H04L 67/025* (2013.01); *H04L 67/04* (2013.01)

(58) Field of Classification Search
CPC ........... H04L 67/025; G06F 17/30175; G06F 17/30575–17/584
See application file for complete search history.

(56) References Cited

U.S. PATENT DOCUMENTS 7,996,527 B2 * 8/2011 Isaacs ................... H04L 12/581
379/373.01
8,942,719 B1 * 1/2015 Hyde .................... G01S 5/0231
455/411

(Continued)

FOREIGN PATENT DOCUMENTS

CN 101877848 11/2010
CN 102356395 2/2012

(Continued)

OTHER PUBLICATIONS

Chartier, David. "Apple updates MobileMe, releases Find my iPhone app". Macworld. Jun. 18, 2010.*

(Continued)

*Primary Examiner* — Brendan Higa
(74) *Attorney, Agent, or Firm* — Anova Law Group, PLLC

(57) ABSTRACT

The present disclosure is directed to a method, device, server, and system for managing a system. The method including: a first cloud-connectable device obtaining a connection status of a target cloud-connectable device using a same account, the first cloud-connectable device sending to the server a managing message regarding the target cloud-connectable device, the server managing the connection status of the target cloud-connectable device based on the managing message transmitted from the first cloud-connectable device. The present disclosure can facilitate effective management of multiple cloud-connectable devices capable of receiving cloud server.

14 Claims, 5 Drawing Sheets

(56) References Cited

U.S. PATENT DOCUMENTS

| | | | | |
|---|---|---|---|---|
| 2003/0083046 | A1* | 5/2003 | Mathis | H04L 12/1818 455/412.1 |
| 2003/0105812 | A1* | 6/2003 | Flowers, Jr. | H04L 63/29 709/203 |
| 2005/0221800 | A1* | 10/2005 | Jackson | H04M 1/72552 455/411 |
| 2006/0075263 | A1* | 4/2006 | Taylor | G06F 21/6245 713/194 |
| 2006/0258333 | A1* | 11/2006 | Yang | G06F 11/1451 455/412.1 |
| 2007/0294529 | A1* | 12/2007 | Blair | G06F 21/6218 713/160 |
| 2008/0005561 | A1* | 1/2008 | Brown | G06F 21/305 713/164 |
| 2008/0034224 | A1 | 2/2008 | Ferren et al. | |
| 2008/0052395 | A1* | 2/2008 | Wright | H04L 63/20 709/224 |
| 2008/0165807 | A1* | 7/2008 | Nilo | H04L 67/1095 370/503 |
| 2009/0044252 | A1* | 2/2009 | Kashima | H04L 12/581 726/3 |
| 2009/0247122 | A1* | 10/2009 | Fitzgerald | G06F 21/88 455/410 |
| 2011/0078501 | A1 | 3/2011 | Koch et al. | |
| 2011/0141276 | A1* | 6/2011 | Borghei | H04W 12/08 348/143 |
| 2011/0191838 | A1* | 8/2011 | Yanagihara | G06F 15/16 726/7 |
| 2014/0364099 | A1* | 12/2014 | Pai | H04L 63/08 455/418 |

FOREIGN PATENT DOCUMENTS

| | | |
|---|---|---|
| CN | 102509033 | 6/2012 |
| CN | 102546242 | 7/2012 |

OTHER PUBLICATIONS

International Search Report and Written Opinion mailed Aug. 29, 2013, directed to International Application No. PCT/CN2013/076144; 13 pages.

Chinese Office Action dated Jul. 3, 2014, directed to CN Application No. 201210341323.8; concise explanation of relevance provided; 12 pages.

Chinese Office Action dated Feb. 28, 2015, directed to CN Application No. 201210341323.8; concise explanation of relevance provided;11 pages.

Chinese Office Action dated Sep. 18, 2015, directed to CN Application No. 201210341323.8; concise explanation of relevance provided;12 pages.

* cited by examiner

METHOD, DEVICE, SERVER, AND SYSTEM FOR MANAGING DEVICES

CROSS REFERENCE TO RELATED APPLICATION

This application is a U.S. continuation application under 35 U.S.C. §111(a) claiming priority, under 35 U.S.C. §120 and 365(c), to International Application No. PCT/CN2013/076144 filed on May 23, 2013, which claims the priority benefit of Chinese Patent Application No. 201210341323.8, filed Sep. 14, 2012, the contents of both the PCT application and the Chinese application are incorporated by reference herein in their entirety for all purposes.

FIELD

The present disclosure relates to the area of Internet technologies, and in particular, to a method, device, server, and system for managing one or more devices.

BACKGROUND

Cloud computing is an Internet-based service model, which typically involves providing a dynamic, scalable, and digitized resource over the Internet. With the development of the mobile Internet and microchip technology, especially the development of the mobile Internet, cloud-connecting devices can include personal computers (PCs), smartphones, tablet PCs, and network televisions, etc. As such, a user can have multiple connecting devices simultaneously receiving cloud services using the same user account. As a result, there is a need for the user to manage the multiple connecting devices simultaneously connected to the cloud. For example, when a user loses a mobile phone with a live connection to the cloud services, the user's account, privacy, and/or data can be compromised as a result of the continued cloud services. This can bring unnecessary lose to the user.

SUMMARY

One of the technical problems to be solved by embodiments of the disclosure is to provide a method, device, server, and system that can effectively manage multiple cloud-connecting devices connected to a cloud service.

To solve the above-identified technical problem, an embodiment in a first aspect of the disclosure provides a device-managing method. The method includes: a first cloud-connecting device obtaining, from a server, connection status of one or more target cloud-connecting devices associated with the same user account; the first cloud-connecting device transmitting to the server a connection-managing message directed to the one or more target cloud-connecting devices; and the server managing the connection status of the one or more target cloud-connecting devices based on the connection-managing message transmitted from the first cloud-connecting device.

Accordingly, an embodiment in a second aspect of the disclosure provides another device-managing method. The method includes: obtaining, from a server, connection status of one or more target cloud-connecting devices associated with the same user account; transmitting to the server a connection-managing message directed to the one or more target cloud-connecting devices, and causing the server to manage the connection status of the one or more target cloud-connecting devices based on the connection-managing message.

Accordingly, an embodiment in a third aspect of the disclosure provides yet another device-managing method. The method includes: transmitting, to a first cloud-connecting device, connection status of one or more target cloud-connecting devices associated with the same account; obtaining, from the first cloud-connecting device, a connection-managing message directed to the one or more target cloud-connecting devices; and managing the connection status of the one or more target cloud-connecting devices based on the connection-managing message.

Accordingly, an embodiment in a fourth aspect of the disclosure provides a cloud-connecting device. The cloud-connecting device includes: a connection status obtaining module for obtaining, from a server, the connection status of one or more target cloud-connecting devices associated with a same account; a connection-managing message transmitting module for transmitting, to the server, a connection-managing message directed to the one or more target cloud-connecting devices to cause the server to manage the connection status of the one or more target cloud-connecting devices based on the connection-managing message.

Accordingly, an embodiment in the fifth aspect of the disclosure provides a server. The server includes: a connection status transmitting module for transmitting, to a first cloud-connecting device, connection status of one or more of the target cloud-connecting devices associated with a same account; a connection-managing message receiving module for receiving, from the first cloud-connecting device, a connection-managing message directed to the one or more target cloud-connecting devices; and a connection status managing module for managing the connection status of the one or more target cloud-connecting devices based on the connection-managing message.

Accordingly, an embodiment in a sixth aspect of the disclosure provides a cloud-connecting device managing system. The cloud-connecting managing system includes, for example, the server such as the one disclosed in the embodiment in the fifth aspect of disclosure and at least one cloud-connecting device such as the one disclosed in the embodiment in the fourth aspect of the disclosure. The at least one cloud-connecting device can be for obtaining, from the server, connection status of the one or more target cloud-connecting devices associated with the same account. The server can be for managing the connection status of the at least one target cloud-connecting device based on a connection-managing message transmitted from the at least one cloud-connecting device.

Accordingly, an embodiment in a seventh aspect of the disclosure provides a non-transitory computer-readable medium storing programs, which when executed, perform some or all steps in the methods disclosed in the embodiments in the first, second, or third aspects of the disclosure.

Embodiments of the disclosure can provide at least the following useful effects, such as managing connection status of one or more cloud-connecting devices associated with the same account effectively by transmitting one or more connecting-managing messages to the server to manage the connection status of the one or more cloud-connecting devices.

BRIEF DESCRIPTION OF THE DRAWINGS

To clarify the technical features disclosed in the embodiments of the disclosure, a brief description of the figures in support of the disclosed embodiments is provided below. It should be understood that the figures only illustrate a number of embodiments of the disclosure. Additional figures can be derived from these figures by a person skilled in the art.

DETAILED DESCRIPTION

Figure 1:
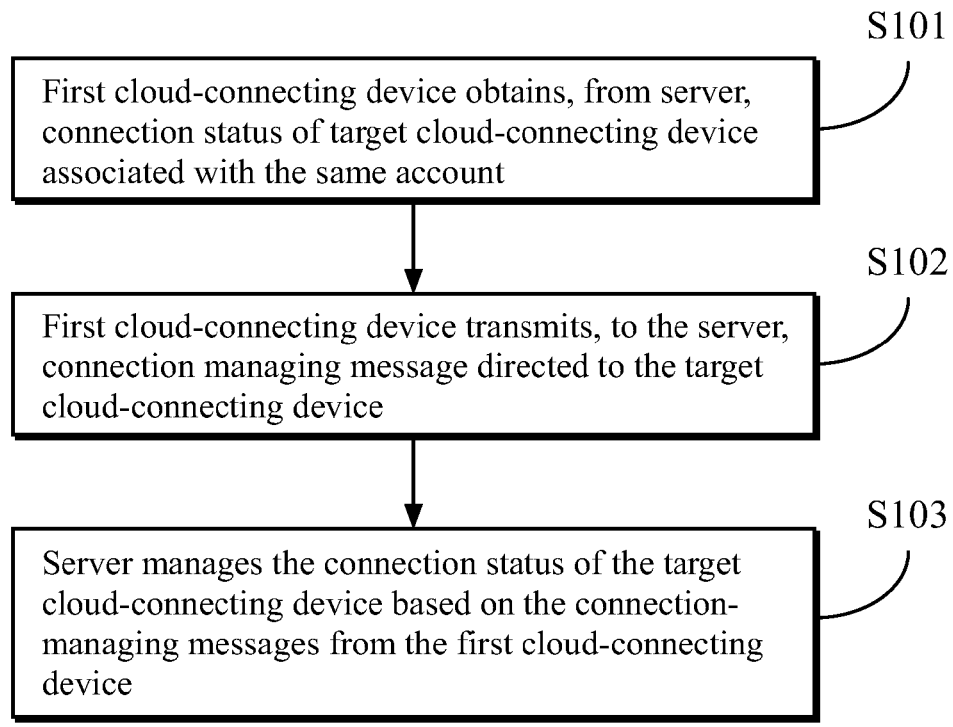
FIG. 1 is a flow chart illustrating an exemplary first device-managing method, according to an embodiment of the present disclosure.

A detailed description of the technical solutions of the embodiments of the present disclosure is provided below in view of the accompanying drawings. It should be understood that the embodiments described below are representative embodiments of the present disclosure rather than a complete disclosure of the every possible embodiment. The present disclosure can also include any other embodiments that can be derived from these disclosed embodiments by a person with ordinary skill in the art without any additional inventive work. It is to be understood that other embodiments can be used and structural changes can be made without departing from the scope of the embodiments of this disclosure.

This disclosure generally relates to systems and methods for controlling one or more devices connected to a server remotely from a controlling device. The systems and methods can rely on a common account through which multiple devices can connect to a server. One of the devices (e.g., the controlling device) can retrieve the connection status of the other devices (e.g., a list of devices currently logged onto the server). The controlling device can then send a message to the server, instructing the server to perform certain operations on the other devices. Such operation can include, but are not limited to, disconnecting/reconnecting a device from/to the server, configuring various settings of the device such as the access right of the device with respect to the cloud service and the password setting on the device, deleting data from the device, obtaining data such as GPS information from the device, formatting the device, and backing up/restoring the device from a backup. The controlling device can manage multiple devices as a group by sending to the server a device-grouping message and having the server perform the operations on all devices in the same group.

These remotely controlled operations can provide a variety of useful and even critical mechanisms for the user to protect data on remote devices and/or retrieve information from these devices. For example, if a user loses his mobile phone, he can log onto a cloud server from his home PC to disconnect the lost phone from the server to prevent additional information from being automatically downloaded to the lost phone. Similarly, he can send request the server to retrieve the GPS coordinates from the lost phone to recover the phone. He can also reset one or more passwords on the phone or simply reformat the whole phone to prevent personal information from being accessed by a stranger. In addition, he can also retrieve personal data, such as pictures and his contact list from the lost phone via the server using the same account. It should be understood that the control operations are not limited to the ones mentioned above. In fact, any operation that can be performed locally on the device can be performed remotely from a controlling device. The advantages provided by the disclosed remote control mechanisms are also not limited to retrieving data and protecting personal information.

In the various embodiments described below, the controlling device and the one or more devices controlled by the controlling device (i.e., controlled devices) can be associated with the same account. As referred hereinafter, an account can be a user account of a network-based application or service. For example, it can be an account for accessing a cloud service provided by one or more cloud servers (or any other types of remote data storage/sharing applications). It can also be an account associated with a messaging application/service that allows multiple devices to transmit and receive messages over a network.

The controlling device and the one or more controlled devices can all be logged onto the server under the same account (e.g., using the same user name/ID and password). In one example, a user may have multiple devices logged into the same account at the same time. For example, the user can have his smartphone, tablet PC, and laptop PC set up so that each of these devices logs into a cloud account automatically when the device is started to allow, for example, automatic synchronization of data on all three devices.

As referred herein, the controlling and controlled devices can be any network-enabled electronic devices including, but not limited to, PCs, Macs, desktop computers, laptop computers, tablet PCs, smartphones including iPhones, Android phones, Windows phones, and Blackberries, e-readers, in-car communication devices, televisions and other consumer electronic devices with sufficient network capabilities. In the embodiments described below, these devices can be referred to as cloud-connecting devices. However, it should be understood that the devices are not limited to those that connect to a cloud. It should also be understood that a cloud-connecting device can connect to network devices or servers not a part of a cloud. A controlling device can be referred to as a first cloud-connecting device and one or more controlled devices can be referred to as target cloud-connecting device(s). Any one of the devices logged onto the server using the same account can be a controlling device for controlling one or more of the other devices. Alternatively, only devices with managing rights can control other devices. A device can be both a controlling device and a controlled device. The controlling device and one or more controlled devices can belong to the same user or different users as long as they can log onto the server using the same account.

As referred herein, a server can be a cloud server or any other network server hosting a network-based application/service. The cloud server can provide limited or unlimited amount of storage space for each user. Each user can access the application/service hosted on the cloud server by signing into his/her account. The server can maintain a list of devices associated with a particular user account. The list can be automatically generated by capturing an ID of every device from which the account has been accessed. Alternatively, the list can be manually created and updated by the user. For example, the user can add a device to the list the first time he uses the device to log onto the server. He can also remove a device from the list when he no longer uses the device. Alternatively, the list can be dynamically generated and updated every time one or more devices log into the user's account.

Once signed in, a user can manually transmit data to and receive data from the server over a network. Additionally or alternatively, the application/service can be set up so that, when a device logs onto the server, it can be automatically synchronized with the server. For example, a copy of the pictures uploaded from one of his devices can be automatically delivered to the rest of his devices so long as all the devices are logged onto the same account. This can allow data available on the server to be automatically distributed to multiple devices without user instruction. In addition, the user can send various messages to the server. As will be detailed in the embodiments below, some of the messages can include one or more commands and/or instructions to be executed by the server to perform certain managing operations on one or more of the other devices. In return, the server can send information such as the connection status of the devices associated with a particular account. The connection status can include a listing of all devices associated with the account with their device names, IDs, and/or type/model information. In addition, the connection status can indicate whether a device is online (i.e., logged onto the server), offline, or any other status.

The server can be accessed by the one or more controlling/controlled devices over a network. The network can be any network such as the Internet, local area network (LAN), wide area network (WAN), cellular network, Wi-Fi network, and virtual private network (VPN). Although the embodiments discuss remotely controlling one or more devices, it should be understood that the controlling and controlled devices can be in close proximity of one other or far away from each other so long as the devices are logged onto the server using the same account.

The cloud-connecting devices described in the embodiments of the disclosure can include PCs, mobile phones, tablet PCs, smartphones, e-readers, laptop PCs, in-car terminals, and any other network-enabled devices capable of receiving cloud service over a network. The cloud service can include, for example, a cloud photo album for storing photos, cloud space for storing documents, and cloud notebook for storing personal notes.

FIG. 1 is a flow chart illustrating a device-managing method, according to a first embodiment of the disclosure. As illustrated, the method can include the following steps.

S101: A first cloud connecting device can obtain from a server connection status of a target cloud-connecting device associated with the same user account.

In operation, after logging onto the server using an account, the first cloud connecting device can obtain from the server the connection status of another cloud-connecting device logged onto the server using the same account, i.e., the connection status of a target cloud-connecting device. In one example, the first cloud-connecting device can be a mobile phone. After the user's mobile phone logs onto the server, the connection status of a tablet PC, which is logged onto the server using the same account, can be obtained from the server. The connection status can be displayed on an interface of the mobile phone. The connection status of one or more target cloud-connecting devices can include their corresponding device IDs. The connection status can indicate whether a particular target cloud-connecting device is connected to the server. Also selectable can include the access rights associated with a particular target device and document information obtained by the particular device from the server. Such document information can include a listing of photos in an album synchronized to a cloud album, a listing of documents synchronized to a cloud space, or a listing of notes synchronized to a cloud notebook. Alternatively, the number of cloud-connecting devices connected to the server using the same account does not have to be limited to two. The first cloud-connecting device can obtain a listing of devices from the server including one or more cloud-connecting devices connected to the server using the same account as the first cloud-connecting device. This listing of devices can include the connection status of the one or more cloud-connecting devices.

The connection status of the one or more cloud-connecting devices can be obtained by the server from each of the cloud-connecting devices when or after the cloud-connecting devices log onto the server. The connection status of a particular target cloud-connecting device can be changed by the device itself or another cloud-connecting device logged onto the server using the same account. The server can update the connection status of the cloud-connecting device in real time.

S102: The first cloud-connecting device can transmit to the server a connection-managing message directed to the one or more target cloud-connecting devices.

In operation, the first cloud-connecting device can be any cloud-connecting device having managing rights under the same account. The first cloud-connecting device can manage the connection status of other cloud-connecting device(s) by transmitting connection-managing messages to the server. The first cloud-connecting devices can include a device logged onto the server for the first time using the account. Alternatively, the first cloud-connecting device can be a cloud-connecting device having managing rights set up manually by the user.

S103: The server can manage the connection status of the one or more target cloud-connecting devices based on the connecting-managing message transmitted from the first cloud-connecting device.

The server managing the connection status of the one or more target cloud-connecting devices can include disconnecting/re-connecting the connections to the one or more target cloud-connecting devices. If a connection to a target cloud-connecting device is disconnected, the target cloud-connecting device is unable to receive any cloud service provided by the server. The server managing the connection status of the one or more target cloud-connecting devices can also include setting the types of services provided to the one or more target cloud-connecting devices. For example, a target cloud-connecting device can only upload, but not download documents. Alternatively, the target cloud-connecting device can only download, but not upload documents. Alternatively, the target cloud-connecting device can only browse online, but cannot download or upload documents. The server managing the connection status of the one or more target cloud-connecting devices can also include executing a delete command directed to the one or more target cloud-connecting devices, causing information previously obtained from the server to be deleted from the target cloud-connecting device(s). For example, when the user loses a mobile phone, he can use his computer to delete, from the lost mobile phone, photos, documents, or event items previously obtained from the server, by sending a connection-managing message to the server to ensure that his privacy is protected.

Figure 2:
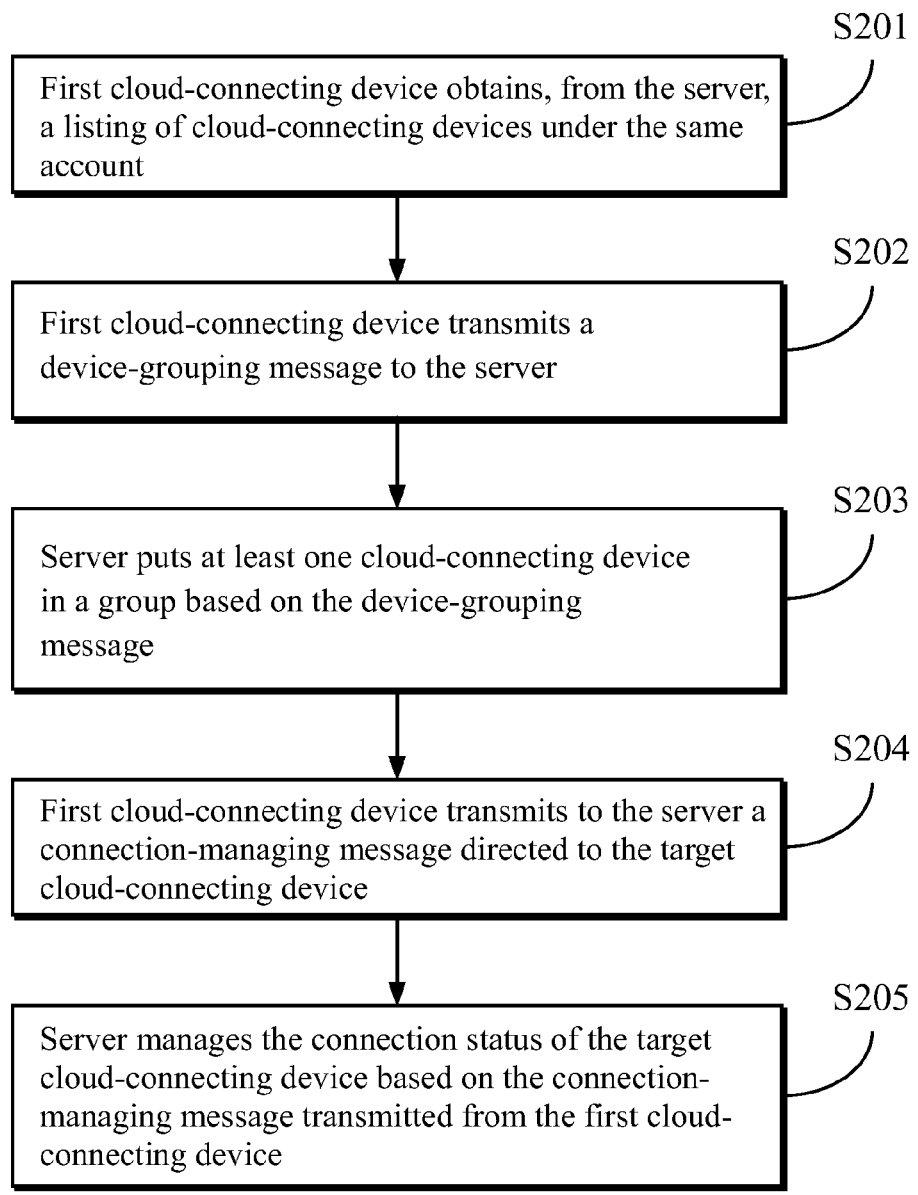
FIG. 2 is a flow chart illustrating an exemplary second device-managing method, according to another embodiment of the present disclosure.

FIG. 2 is a flow chart illustrating a device-managing method, according to a second embodiment of the disclosure. As illustrated, the method in this embodiment can include the following steps.

S201: A first cloud-connecting device can obtain, from a server, a listing of cloud-connecting devices associated with the same account, including the connection status of the one or more cloud-connecting devices logged onto the server using the same account. The connection status of the one or more cloud-connecting devices can include the device IDs of the cloud-connecting devices. The connection status can identify whether a cloud-connecting device is connected to the server. The connection status can also include the rights associated with a particular cloud connecting device and the document information obtained by the device from the server. These documents can include, for example, a listing of album photos synchronized to a cloud photo album, a listing of documents synchronized to a cloud space, or a listing of events synchronized to a cloud notebook. The connection status of the cloud-connecting devices can be obtained by the server from each of the cloud-connecting devices when or after the cloud-connecting device logs onto the server. The connection status of a target cloud-connecting device can be changed by the device itself or by another cloud-connecting device logged onto the server using the same account. The server can update the connection status of the cloud-connecting device in real time.

S202: The first cloud-connecting device can transmit a device-grouping message to the server.

In operation, the first cloud-connecting device can manage, by group, the cloud-connecting devices that are connected to the server using the same account by transmitting a device-grouping message to the server in response to a user operation. For example, the message can instruct the server to put tablet PCs in one group, mobile phones in another group, and office/home PCs and laptop PCs in yet another group.

S203: The server can group the list of cloud-connecting devices based on the device-grouping message.

More specifically, the server can put one or more cloud-connecting devices in a particular group based on the device-grouping message transmitted from the first cloud-connecting device. The server can present the grouping results in the listing of cloud-connecting devices to the first cloud-connecting device, so that the first cloud-connecting device can manage a group of one or more cloud-connecting devices in the same way.

S204: The first cloud-connecting device can transmit to the server a connection-managing message directed to one or more target cloud-connecting devices.

More specifically, in this embodiment, the one or more target cloud-connecting devices can be the cloud-connecting devices in a group as defined in S203. For example, the first cloud-connecting device can be a mobile device. The listing of cloud-connecting devices received from the server can include a "pad" group including two different tablet PCs. The user can send one or more connection-managing messages directed to the "pad" group from the mobile phone, requesting that the server manage all of the cloud-connecting devices in this group in a unified manner.

S205: The server can manage the connection status of the one or more target cloud-connecting devices based on the connection-managing message transmitted from the first cloud-connecting device.

The server managing the connection status of the one or more target cloud-connecting devices can include disconnecting/re-connecting a connection to the target cloud-connecting device. If the connection to the target cloud-connecting device is disconnected, the target cloud-connecting device is unable to receive the cloud service provided by the server. The server managing the connection status of the one or more target cloud-connecting devices can also include setting the types of services provided to the one or more target cloud-connecting devices. For example, a target cloud-connecting device can only upload, but not download documents. Alternatively, the target cloud-connecting device can only download, but not upload documents. Alternatively, the target cloud-connecting device can only browse online, but cannot download or upload documents. The server managing the connection status of the one or more target cloud-connecting devices can also include executing a delete command directed to the one or more target cloud-connecting devices, causing information previously obtained from the server to be deleted from the one or more target cloud-connecting devices. For example, when the user loses a mobile phone, he can use his computer to delete, from the mobile phone, photos, documents, or notes previously obtained from the server, by sending a connection-managing message to the server to ensure that his privacy is protected. In this embodiment, the server can manage multiple cloud-connecting devices in the same group in the same manner, based on the connection-managing message transmitted from the first cloud-connecting device, and thereby simplifying user operation.

In another embodiment, a non-transitory computer-readable medium storing one or more programs is disclosed. The one or more programs, when executed, can perform some or all steps of the device-managing methods illustrated in FIG. 1 or 2.

Figure 3:
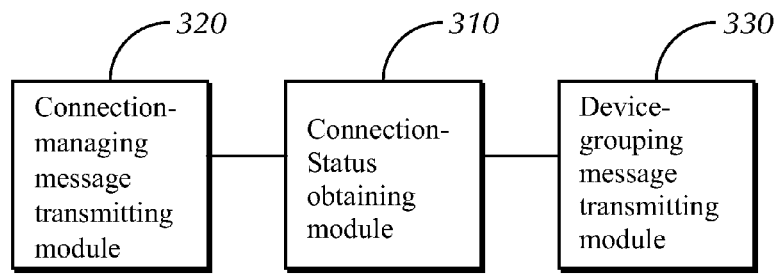
FIG. 3 is a block diagram illustrating the exemplary structure of a type of cloud-connecting device, according to an embodiment of the present disclosure.

FIG. 3 is a block diagram illustrating the exemplary structure of a cloud-connecting device, according to an embodiment of the disclosure. As illustrated, the cloud-connecting device of this embodiment can include a connection-status obtaining module 310 for obtaining, from a server, the connection-status of a target cloud-connecting device associated with the same account.

In operation, after the cloud-connecting device logs onto the server through an account, the connection-status obtaining module 310 can obtain, from the server, the connection status of another cloud-connecting device that has logged onto the server using the same account, i.e., the connection status of a target cloud-connecting device. For example, the local cloud-connecting device can be a mobile phone. After the user logs onto the server from the mobile phone, the connection-status obtaining module 310 can obtain, from the server, the connection status of a tablet PC that has logged onto the server using the same account. The connection-status obtaining module can then display, on an interface of the mobile phone, the connection status of the target cloud-connecting device including its device ID. The device ID can indicate that the device has already connected to the server. The connection status can indicate whether the particular target cloud-connecting device is connected to the server. Also selectable can include the access rights associated with a particular target device and document information obtained by the particular device from the server. Such document information can include a listing of pictures in an album synchronized to a cloud album, a listing of documents synchronized to a cloud space, or a listing of events synchronized to a cloud notebook. Alternatively, the number of cloud-connecting devices connected to the server using the same account does not have to be limited to two. The first cloud-connecting device can obtain a listing of devices from the server including one or more cloud-connecting devices connected to the server using the same account as the first cloud-connecting device. This listing of devices can include the connection status of the one or more cloud-connecting devices.

The connection status of the cloud-connecting devices can be obtained by the server from each of the cloud-connecting devices when or after the cloud-connecting device logs onto the server. The connection status of a target cloud-connecting device can be changed by the device itself or by another cloud-connecting device logged onto the server using the same account. The server can update the connection status of the cloud-connecting device in real time.

In this embodiment, the cloud-connecting device can also include a connection-managing message transmitting module 320 for transmitting, to the server, one or more connection-managing messages directed to the one or more target cloud-connecting devices. This can allow the server to manage the connection status of the one or more target cloud-connecting devices based on the one or more connection-managing messages. In operation, only the one or more of the cloud-connecting devices with managing rights can transmit, via their connection-managing message transmitting module 320, connection-managing messages to the server to manage the connection status of other cloud-connecting devices associated with the same account. For example, the first cloud-connecting devices can include a device logged onto the server for the first time using the account. Alternatively, the first cloud-connecting device can be a cloud-connecting device having managing rights set up manually by the user.

The server managing the connection status of the one or more target cloud-connecting devices can include disconnecting/re-connecting a connection to the target cloud-connecting device. If the connection to the target cloud-connecting device is disconnected, the target cloud-connecting device is unable to receive the cloud service provided by the server. The server managing the connection status of the one or more target cloud-connecting devices can also include setting the types of services provided to the one or more target cloud-connecting devices. For example, a target cloud-connecting device can only upload, but not download documents. Alternatively, the target cloud-connecting device can only download, but not upload documents. Alternatively, the target cloud-connecting device can only browse online, but cannot download or upload documents. The server managing the connection status of the one or more target cloud-connecting devices can also include executing a delete command directed to the one or more target cloud-connecting devices, causing information previously obtained from the server to be deleted from the one or more target cloud-connecting devices. For example, when the user loses a mobile phone, he can use his computer to delete, from the mobile phone, photos, documents, or notes previously obtained from the server, by sending a connection-managing message to the server to ensure that his privacy is protected.

Optionally, in this embodiment, the cloud-connecting device can also include a device-grouping message transmission module 330 for transmitting one or more device-grouping messages to the server to instruct the server to group the devices in the listing of cloud-connecting devices. In operation, the device-grouping message transmitting module 330 can manage, by group, the cloud-connecting devices that are connected to the server using the same account by transmitting a device-grouping message to the server in response to a user operation. For example, the message can instruct the server to put tablet PCs in one group, mobile phones in another group, and office/home PCs and laptop PCs in yet another group. The server can put one or more of the cloud-connecting devices from the list of cloud-connecting devices in a group based on the device-grouping message transmitted from the first cloud-connecting device. The server can present the grouping results in the listing of cloud-connecting devices to the first cloud-connecting device, so that the connection-managing message module 320 can transmit, to the server, one or more connection-managing messages directed to all cloud-connecting devices in the same group. That is, the one or more target cloud-connecting devices, to which the one or more connection-managing messages are directed, can include all the cloud-connecting devices in the same group. This makes it possible to manage multiple cloud-connecting devices in the same group in the same manner, thereby simplifying user operation.

Figure 4:
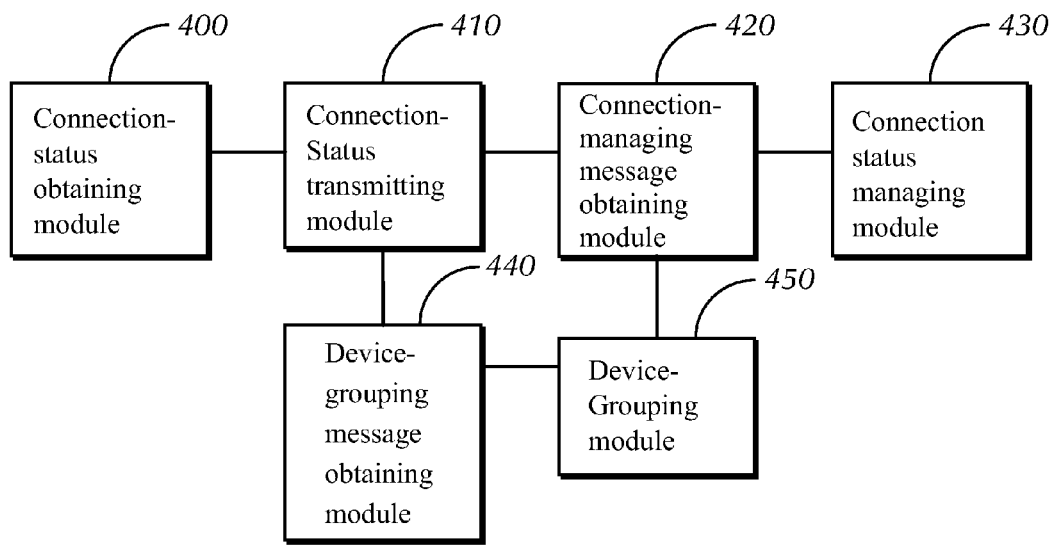
FIG. 4 is block diagram illustrating the exemplary structure of a server, according to an embodiment of the present disclosure.

FIG. 4 is a block diagram illustrating the exemplary structures of a server, according to an embodiment of the disclosure. As illustrated, the server can include a connection-status transmitting module 410 for transmitting, to a first cloud-connecting device, the connection status of one or more target cloud-connecting devices using the same account as does the first cloud-connecting device. More specifically, after the first cloud-connecting device logs onto the server through the account, the connection-status transmission module 410 can transmit, to the first cloud-connecting device, the connection-status of the one or more other cloud-connecting devices that have logged onto the server using the same account, i.e., the connection-status of the one or more target cloud-connecting devices. For example, the first cloud-connecting device can be a mobile phone. After the user logs onto the server from the mobile phone, he can obtain from the connection-status transmission module 410 the connection status of a tablet PC, which has also logged onto the server using the same account. The connection status can be displayed on an interface of the mobile device. The connection status of a target cloud-connecting device can include its corresponding device ID, which can be used for indicating whether the device is connected to the server. Also selectable can include the access rights associated with a particular target device and document information obtained by the particular device from the server. Such document information can include a listing of pictures in an album synchronized to a cloud album, a listing of documents synchronized to a cloud space, or a listing of notes synchronized to a cloud notebook. Alternatively, the number of cloud-connecting devices connected to the server using the same account does not have to be limited to two. The connection-status transmitting module 410 can transmit, to the first cloud-connecting device, a listing of devices associated with the same account as the first cloud-connecting device. The listing can include the connection status of the multiple cloud-connecting devices connected to the server using the same account. The connection status can include the connection status of the one or more target cloud-connecting devices.

The server can also include a connection-managing message obtaining module 420 for obtaining, from a first cloud-connecting device, one or more connection-managing messages directed to one or more target cloud-connecting devices. In operation, the first cloud-connecting device can be a cloud-connecting device with managing rights under the same account. The connection-managing message obtaining module 420 can obtain one or more connection-managing messages from a first cloud-connecting device with managing rights to manage the connection status of one or more other cloud-connecting devices. The cloud-connecting devices having managing rights can be the first device among the multiple cloud-connecting devices to log onto the server using the account. Alternatively, the user can manually set one or more devices to be the cloud-connecting devices having managing rights.

The server can also include a connection status managing module 430 for managing the connection status of the target cloud-connecting device based on a connection-managing message. The connection status managing module 430 managing the connection status of a target cloud-connecting device can include disconnecting/re-connecting a connection to the target cloud-connecting device. If the connection to the target cloud-connecting device is disconnected, the target cloud-connecting device is unable to receive the cloud service provided by the server. The server managing the connection status of the one or more target cloud-connecting devices can also include setting the types of services provided to the one or more target cloud-connecting devices. For example, a target cloud-connecting device can only upload, but not download documents. Alternatively, the target cloud-connecting device can only download, but not upload documents. Alternatively, the target cloud-connecting device can only browse online, but cannot download or upload documents. The server managing the connection status of the one or more target cloud-connecting devices can also include executing a delete command directed to the one or more target cloud-connecting devices, causing information previously obtained from the server to be deleted from the one or more target cloud-connecting devices. For example, when the user loses a mobile phone, he can use his computer to delete, from the mobile phone, photos, documents, or notes previously obtained from the server, by sending a connection-managing message to the server to ensure that his privacy is protected.

Additionally, the server in this embodiment can also include a connection-status obtaining module 400 for obtaining the device IDs of the one or more target cloud-connecting devices after the one or more target cloud-connecting devices log onto the server. The connection status obtaining module 400 can also update the connection status of the one or more target cloud-connecting devices. The connection status of a particular target cloud-connecting device can be updated by the device itself or by another cloud-connecting device logged onto to the server using the same account. The connection-status obtaining module 400 can update the connection status of the one or more target cloud-connecting modules in real time.

Additionally, the server in this embodiment can also include a device-grouping message obtaining module 440 for obtaining device-grouping messages transmitted from the first cloud-connecting device. In operation, the device-grouping message obtaining module 440 can obtain a device grouping message sent by the first cloud-connecting device. The device grouping message can instruct the server to manage, by group, one or more cloud-connecting devices connected to the server through the same account. For example, the message can instruct the server to put tablet PCs in one group, mobile phones in another group, and office/home PCs and laptop PCs in yet another group.

Additionally, in this embodiment, the server can also include a device-grouping module 450 for grouping the cloud-connecting devices in the listing of cloud-connecting devices based on the device-grouping message. More specifically, the device-grouping module 450 can group one or more cloud-connecting devices from the listing of cloud-connecting devices in a group based on the device-grouping message. The device-grouping module 450 can also display the grouping results in the listing of cloud-connecting devices to the first cloud-connecting device, so that the connection-managing message obtaining module 420 can obtain from the first cloud-connecting device a connection-managing message directed to all of the cloud-connecting devices in the same group. This makes it possible to manage multiple cloud-connecting devices in the same group in the same manner, thereby simplifying user operation.

Figure 5:
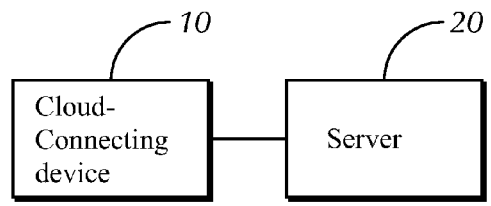
FIG. 5 is a block diagram illustrating the exemplary structure of a cloud-connecting device managing system, according to an embodiment of the present disclosure.

FIG. 5 is a block diagram illustrating an exemplary structure of a cloud-connecting device managing system, according to an embodiment of the disclosure. As illustrated, in this embodiment, the cloud-connecting device managing system can include server 20 and at least one cloud-connecting device 10.

The cloud-connecting device 10 can be the cloud-connecting device described above with reference to FIG. 3. The cloud-connecting device 10 can be used for obtaining, from the server 20, the connection status of one or more target cloud-connecting devices associated with the same account and transmitting, to the server 20, connection-managing message directed to the one or more target cloud-connecting devices.

The server 20 can be the server described above with reference to FIG. 4. The server can be used for managing the connection status of one or more target cloud-connecting devices based on the connection-managing message transmitted by the cloud-connecting device 10.

Embodiments of the disclosure can manage the connection status of all the cloud-connecting devices associated with the same account by transmitting a connection-managing message to the server, thereby effectively managing multiple cloud-connectable devices that can receive cloud service.

Figure 6:
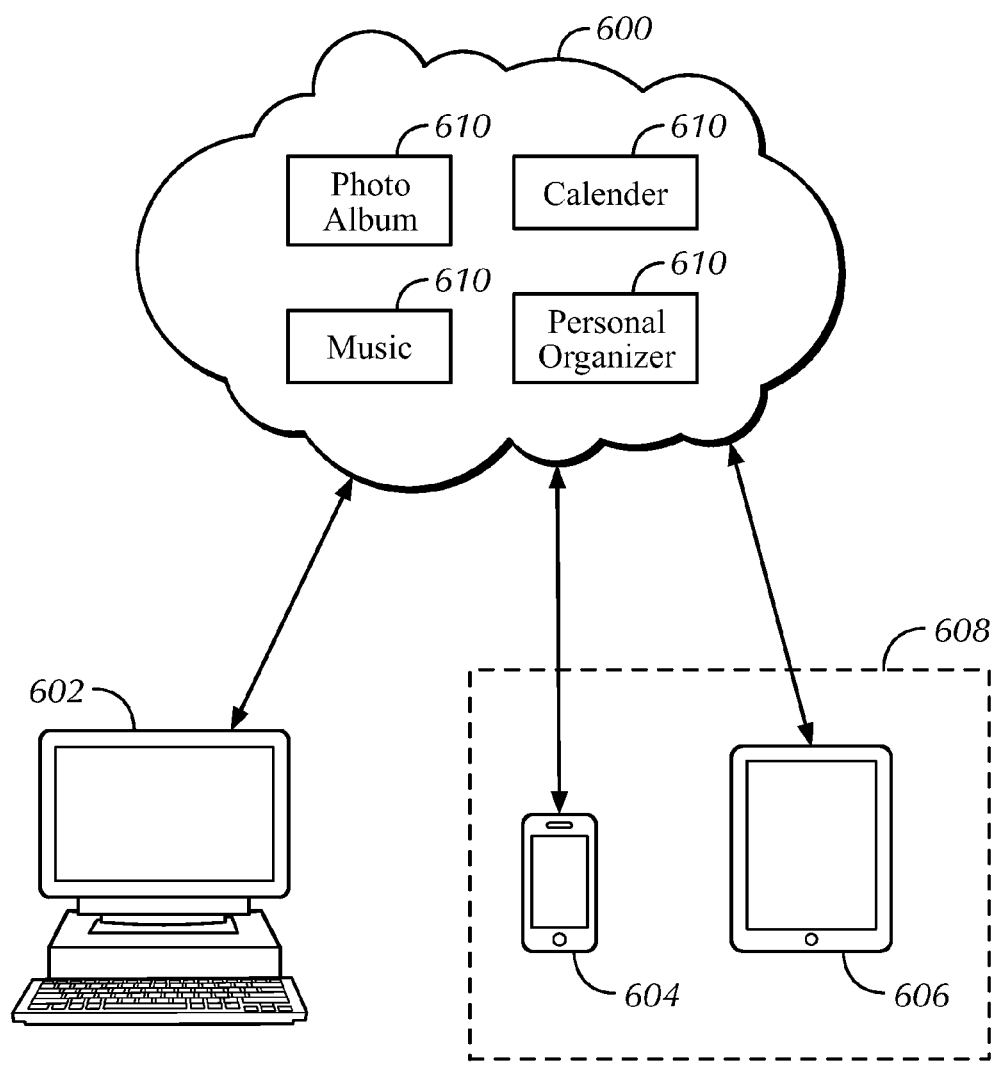
FIG. 6 is a block diagram illustrating the exemplary structures of a cloud-connecting managing system, according to another embodiment of the disclosure.

FIG. 6 is a block diagram illustrating the exemplary structures of a cloud-connecting managing system, according to another embodiment of the disclosure. In this embodiment, three devices, a laptop PC 602, a smartphone 604, and a tablet PC 606, are shown to be connected to a cloud server 600 via a network. The cloud server 600 can provide one or more cloud services, such as a photo album, calendar, personal organizer, and music services (collectively 610), that allow the user to store various data in a storage area provided by the cloud and share this data among one or more of these devices. The user can set up an account for accessing the applications and data on the cloud server 600. In the embodiment, the user can log into his account on the cloud server from any of his three devices 602, 604, 606. Multiple devices can logged onto the server at the same time. The three illustrated devices can be a laptop PC 602, smartphone 604, and tablet PC 606, respectively. Although three devices are shown, it should be understood that the number of devices associated with the user's account can be more or less. It should also be understood that the devices can be of other types of devices.

In this embodiment, the laptop PC 602 can be used by the user to control the other two devices 604, 606. The devices 604, 606 can be controlled individually by the laptop PC 602. Alternatively, they can both be put in a group 608 to be managed together.

In one example, the user may have lost the smartphone 604 and tablet PC 606, but may still have his laptop PC 602. Knowing that the smartphone 604 and tablet PC 606 may still be logged into his cloud account on the server 660, the user can perform one or more tasks on the lost devices 604, 606 from his laptop PC 602 remotely to retrieve and protect his data on the lost devices.

The user may first log into his cloud account from his laptop PC 602. FIGS. 7a-7d illustrate exemplary interfaces that can be displayed on a controlling device for controlling other devices remotely through a server. As illustrated in the exemplary interface of FIG. 7a, a number of menu options relating to the cloud service can be presented to him after he successfully logs into his account. For example, the interface 700 may include options for accessing a cloud-based "Network Storage" 702 and "Photo Album" 704. In addition, a "Remote Control" option can be displayed to allow the user to remotely perform one or more control operations directed to one or more of other devices associated with his account.

Figure 7A:
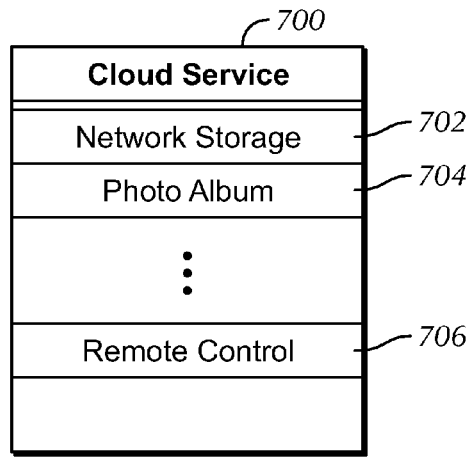
FIGS. 7a-7d illustrate exemplary interfaces on a cloud-connecting device for performing remote device-managing tasks, according to an embodiment of the disclosure.
Figure 7B:
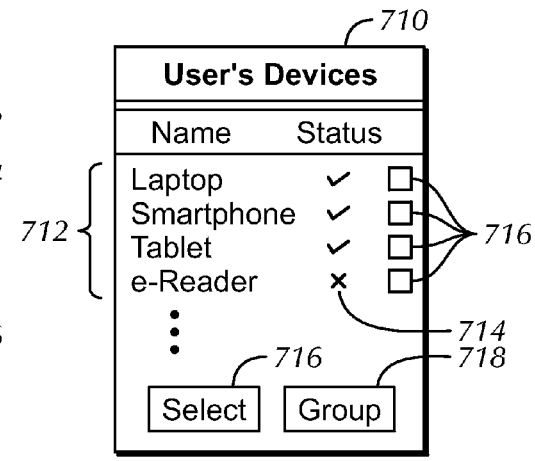

If the user selects the "Remote Control" option, the connection status of other devices associated with his account can be retrieved from the server and displayed on the laptop PC. The connection status can be in the form of a listing of devices along with their respective information. FIG. 7b illustrates an exemplary interface 710 including a list of devices and their connection status with respect to the server. The list can include the names (collectively 712) of all devices (e.g., Laptop, Smartphone, Tablet, e-reader, etc.) associated with the user's account. The status column 714 can show whether each of the devices in the list has logged onto the server using the same account. For example, the laptop, smartphone and tablet are shown to be connected while the e-reader is shown to be offline in FIG. 7b. In this interface, the user can select one or more devices to be controlled remotely by checking the corresponding checkboxes 716 and selecting the "Select" option from the interface 710. In some embodiments, the controlling device (e.g., the laptop PC) itself may not be listed or selectable from this interface. In some embodiments, a "Group" option 718 is provided for the user to group a number of selected devices from the list to be controlled together (e.g., receiving the same instructions and performing the same task). In response to the user grouping multiple devices from the list, a device-grouping list message can be transmitted from the laptop PC to the cloud server so that the server can perform subsequent control operations on all devices in the group.

Figure 7C:
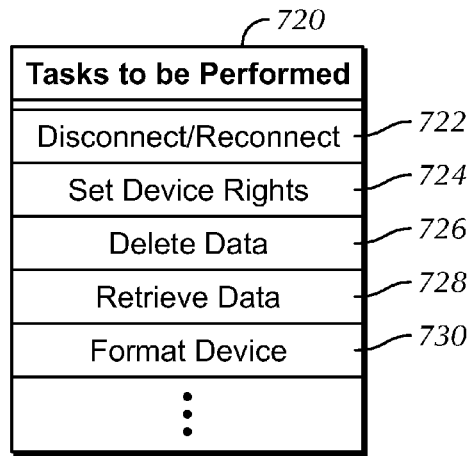

After the user selects one or more of the devices (i.e., controlled devices or target cloud-connecting devices) from the interface of FIG. 7b, he can select one or more tasks to be performed on the selected devices. FIG. 7c illustrates an exemplary interface for selecting one or more of these tasks. As illustrated, the menu options can include, for example, disconnecting/re-connecting the devices 722, setting rights 724 for the devices, deleting or retrieving data from the devices 726, 728, and formatting the device 730. It should be understood that the menu options do not have to include all these options. It should also be understood that the menu options are not limited to those shown in FIG. 7c. In response to the user selecting one or more of these options, a connection-managing message can be sent from the laptop to the cloud server to instruct the server to carry out the corresponding tasks on the selected devices.

Figure 7D:
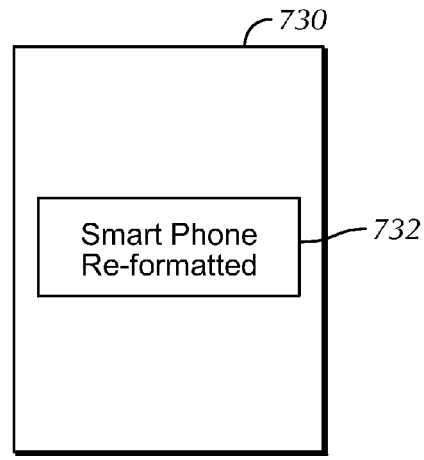

After the selected task is performed on the one or more controlled devices, a confirmation message 732 can be shown in another interface 730, as shown in FIG. 7d. It should be understood that the interfaces illustrated in FIGS. 7a-7d are only exemplary and can be designed differently according to the specific needs of a particular system, without departing from the spirit of the disclosure.

Based on the above-described embodiments, a person skilled in the art can understand that parts of or the whole process described in each of the above embodiments can be performed by hardware in accordance with instructions from one or more computer programs. The one or more computer programs can be stored in a non-transitory readable medium, and when executed, perform the processes described in these embodiments. The non-transitory computer readable medium can be a floppy disk, CD, read-only memory (ROM), or random access memory (RAM).

In some embodiments, one or more of the modules in FIGS. 3-5 can be stored and/or transported within any non-transitory computer-readable storage medium for use by or in connection with an instruction execution system, apparatus, or device, such as a computer-based system, processor-containing system, or other system that can fetch the instructions from the instruction execution system, apparatus, or device and execute the instructions. In the context of this document, a "non-transitory computer-readable storage medium" can be any medium that can contain or store the program for use by or in connection with the instruction execution system, apparatus, or device. The non-transitory computer readable storage medium can include, but is not limited to, an electronic, magnetic, optical, electromagnetic, infrared, or semiconductor system, apparatus or device, a portable computer diskette (magnetic), a random access memory (RAM) (magnetic), a read-only memory (ROM) (magnetic), an erasable programmable read-only memory (EPROM) (magnetic), a portable optical disc such a CD, CD-R, CD-RW, DVD, DVD-R, or DVD-RW, or flash memory such as compact flash cards, secured digital cards, USB memory devices, memory sticks, and the like.

Figure 8:
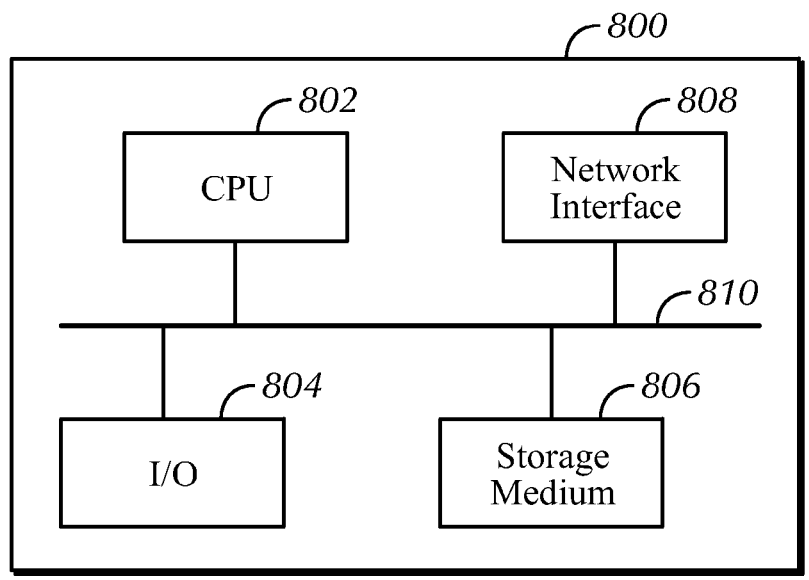
FIG. 8 illustrates exemplary common components of a device, according to an embodiment of the disclosure.

The non-transitory computer readable storage medium can be part of a computing system serving as the server or the cloud-connection device. FIG. 8 illustrates exemplary common components of one such computing system. As illustrated, the system 800 can include a central processing unit (CPU) 802, I/O components 804 including, but not limited to one or more of display, keypad, touch screen, speaker, and microphone, storage medium 806 such as the ones listed in the last paragraph, and network interface 808, all of which can be connected to each other via a system bus 810. The storage medium 806 can include the modules of FIGS. 3-5 depending on whether the system is a server or a cloud-connecting device.

Although embodiments of this disclosure have been fully described with reference to the accompanying drawings, it is to be noted that various changes and modifications will become apparent to those skilled in the art. Such changes and modifications are to be understood as being included within the scope of embodiments of this disclosure as defined by the appended claims.

What is claimed is:

1. A device-managing method, comprising:
    logging, by a first cloud-connecting device, onto a server using an account;
    obtaining, by the first cloud-connecting device from the server, a listing of at least one target cloud-device associated with the same account as the first cloud-connecting device;
    obtaining, from the server, connection status of the at least one target cloud-connecting device included in the listing, wherein the connection status of a target cloud-connecting device includes: information about whether the target cloud-connecting device is connected to the sever, an access right of the target cloud-connecting device, and document information obtained by the target cloud-connecting device from the server; and transmitting, by the first cloud-connecting device to the server, a connection-managing message directed to the at least one target cloud-connecting device, to cause the server to manage the connection status of the at least one target cloud-connecting device based on the connection-managing message;

wherein the connection-managing message includes: disconnecting the at least one target cloud-connecting device from the server, setting the access right of the at least one target cloud-connecting device, and deleting information on the at least target cloud-connecting device.

2. The method of claim 1, comprising:
transmitting, to the server, a device-grouping message to cause the server to group at least one target cloud-connecting device in the listing,
wherein the at least one target cloud-connecting device comprise all of the cloud-connecting devices in a group, and based on the connection-managing message, the server manages the connection status of all of the cloud-connecting devices in the group.

3. The method of claim 1, wherein setting the access right of the at least one target cloud-connecting device includes setting one or more types of services provided by the server, the one or more types of services including:
allowing the at least target cloud-connecting device to download a document, and prohibiting the at least target cloud-connecting device to upload a document;
allowing the at least target cloud-connecting device to upload a document, and prohibiting the at least target cloud-connecting device to download a document; and
allowing the at least target cloud-connecting device to browse a document, and prohibiting the at least target cloud-connecting device to upload or download a document.

4. A device-managing method, comprising:
authenticating, by a server, a first cloud-connecting device when the first cloud-connecting device logs onto the server using an account;
transmitting, to the first cloud-connecting device, a listing of cloud-connecting devices associated with the same account as the first cloud-connecting device;
transmitting, to the first cloud-connecting device, connection status of the at least one target cloud-connecting device included in the listing, wherein the connection status of a target cloud-connecting device includes: information about whether the target cloud-connecting device is connected to the sever, an access right associated with the target cloud-connecting device, and document information obtained by the target cloud-connecting device from the server;
receiving, from the first cloud-connecting device, a connection-managing message directed to the at least one target cloud-connecting device, wherein the connection-managing message includes at least one of: disconnecting the at least one target cloud-connecting device from the server, setting the access right of the at least one target cloud-connecting device, and deleting information on the at least target cloud-connecting device; and
managing the connection status of the at least one target cloud-connecting device based on the connection-managing message.

5. The device-managing method of claim 4, comprising;
obtaining a device-grouping message transmitted from the first cloud-connecting device, and
grouping at least one cloud-connecting device in the listing based on the device-grouping message,
wherein the target cloud-connecting devices comprising all of the cloud-connecting devices in a group.

6. The method of claim 5, further comprising:
based on the connection-managing message, managing, by the server, the connection status of all of the cloud-connecting devices in the group.

7. The device-managing method of claim 4, comprising:
after the at least one target cloud-connecting device log onto the server, obtaining a device ID of the at least one target cloud-connecting device and updating the connection status of the at least one target cloud-connecting device in real time.

8. The device-managing method of claim 4, wherein managing the connection status of the at least one target cloud-connecting device based on the connection-managing message comprises:
according to the connection-managing message about deleting the information on the at least target cloud-connecting device, executing a delete command directed to the at least one target cloud-connecting device to delete at least one document previously obtained from the server in a synchronized fashion.

9. A cloud-connecting device comprising a processor, memory, a plurality of program modules stored in the memory and to be executed by the processor, the plurality of program modules comprising:
a connection-status obtaining module that obtains, from a server that logs in the cloud-connecting device with an account, a listing of at least one target cloud-device associated with the same account as the cloud-connecting device, and connection status of at least one target cloud-connecting device included in the listing, wherein the connection status of a target cloud-connecting device includes: information about whether the target cloud-connecting device is connected to the sever, an access right of the target cloud-connecting device, and document information obtained by the target cloud-connecting device from the server; and
a connection-managing message transmitting module that transmits, to the server, a connection-managing message directed to the at least one target cloud-connecting device, causing the server to managing the at least one target cloud-connecting device based on the connection-managing message, wherein the connection-managing message includes: disconnecting the at least one target cloud-connecting device from the server, setting the access right of the at least one target cloud-connecting device, and deleting information on the at least target cloud-connecting device.

10. The cloud-connecting device of claim 9, comprises:
a device-grouping message transmitting module that transmits a device-grouping message to the server, causing the server to group at least one cloud-connecting device in the listing,
wherein the at least one target cloud-connecting device comprise all of the cloud-connecting devices in a group, and based on the connection-managing message, the server manages the connection status of all of the cloud-connecting devices in the group.

11. A server comprising a processor, memory, a plurality of program modules stored in the memory and to be executed by the processor, the plurality of program modules comprising:
- a connection-status transmitting module that transmits, to a first cloud-connecting device that logs onto the server using an account, a listing of cloud-connecting devices associated with the same account as the first cloud-connecting device, and connection status of at least one target cloud-connecting device included in the listing, wherein the connection status of a target cloud-connecting device includes: information about whether the target cloud-connecting device is connected to the sever, an access right of the target cloud- connecting device, and document information obtained by the target cloud-connecting device from the server;
- a connection-managing message obtaining module that obtains, from the first cloud-connecting device, connection-managing message directed to the at least one target cloud-connecting device, wherein the connection-managing message includes at least one of: disconnecting the at least one target cloud-connecting device from the server, setting the access right of the at least one target cloud-connecting device, and deleting information on the at least target cloud-connecting device; and
- a connection-status managing module that manages the connection status of the at least one target cloud-connecting device based on the connection-managing message.

12. The server of claim 11, comprising:
- device-grouping message obtaining module that obtains a device-grouping message from the first cloud-connecting module,
- a device grouping module that groups at least one cloud-connecting device in the listing based on the device-grouping message,
- wherein the at least one target cloud-connecting device comprise all of the cloud-connecting devices in a group.

13. The server of claim 11 comprising:
- a connection-status obtaining module that, after the at least one target cloud-connecting device log onto the server, obtains device IDs of the at least one target cloud-connecting device and updates the connection status of the target cloud-connecting devices in real time.

14. The server of claim 11, wherein the connection-status managing module managing the connection status of the at least one target cloud-connecting device based on the connection-managing message comprises:
- according to the connection-managing message about deleting the information on the at least target cloud-connecting device, executing a delete command directed to the at least one target cloud-connecting device to delete at least one document previously obtained from the server in a synchronized fashion.

* * * * *